Patented Jan. 19, 1926.

1,570,170

UNITED STATES PATENT OFFICE.

ALFRED OBERLE, OF OAK PARK, ILLINOIS, ASSIGNOR OF ONE-HALF TO THOMAS E. SCOFIELD, OF KANSAS CITY, MISSOURI.

PROCESS FOR RECOVERING VANADIUM FROM PETROLEUM HYDROCARBONS.

No Drawing.    Application filed June 25, 1924.  Serial No. 722,309.

*To all whom it may concern:*

Be it known that I, ALFRED OBERLE, a citizen of the United States, residing in the village of Oak Park, county of Cook, and State of Illinois, have invented certain new and useful Improvements in a Process for Recovering Vanadium from Petroleum Hydrocarbons, of which the following is a specification.

This invention relates to improvements in a process for recovering vanadium from petroleum hydrocarbons, and refers more particularly to a process in which compounds of vanadium are dissolved from residual petroleum products, such as petroleum coke, and heavy residual oils or carbonaceous materials such as the cokey substances resulting from the cracking of petroleum hydrocarbons in the production of motor fuel.

Among the important objects of the invention, are to provide a process in which a residual, solid or semi-solid carbonaceous material, is treated in a manner in which vanadium compounds may be extracted therefrom by leaching with water or other solvents of vanadium.

It has been found that some petroleum hydrocarbons, and particularly the residual carbonaceous materials resulting from the treatment of certain oils, contain considerable quantities of vanadium which may be easily extracted, thereby furnishing a potential supply of vanadium which, at the present time, is relatively a precious metal supplied from a few restricted sources.

In extracting the metal petroleum coke resulting either from the distillation of oils, residue from the cracking of petroleum hydrocarbons, or a cokey carbonaceous material resulting from the treatment of petroleum hydrocarbons, may be heat treated either by roasting or otherwise to drive off any remaining volatile material and at a certain stage in this treatment may be subjected to the action of steam or water which serves to bring out or leach from the cokey material the vanadium which readily goes into solution.

Under certain conditions it has been found advantageous to add, to the carbonaceous material undergoing treatment, an absorptive material such as coal ashes, coke ashes, coke, cinders, ground or broken up slag or any absorptive material such as a porous coke or activated carbon preferably such material as is claimed in my prior application serial No. 672,648, filed November 3, 1923.

If treated with an activated carbon such as a spongy absorptive cokey material as that explained in my prior application, it is important that additional oil residue be added from time to time as during the treatment it will itself become absorptive due to the driving off of the volatile materials.

As a suggested manner of carrying out the preferred procedure, a cokey residual substance such as petroleum coke recovered from a cracking plant, is combined with an absorptive activated carbon and is roasted in a closed retort until substantially all of the volative material has been removed. From time to time portions of the material undergoing treatment may be removed from the retort and water added thereto as a leaching fluid. When the material has reached that stage in the reaction where the addition of water to the surface of the material brings out a yellowish coloring, it has been sufficiently treated. The material should then be leached with a solvent such as water which readily relieves the treated substance of a portion of the vanadium,— the vanadium combining with the solvent to form a yellowish or amber solution.

Subsequent to the leaching operation, the cokey residue may again be heat treated and will, with successive heat treatments and leaching operations, give up vanadium in the manner described.

The funcion of the absorption material, such as the activated carbon, coal ashes, fuller's earth, or innumerable other absorptive materials including diatomaceous earths, kaolins or colloidal clay such as bentonite, is to draw off from the cokey material vanadium which may be subsequently extracted by leaching as described.

As mentioned, this process suggests a potential source of vanadium whereby the element may be extracted in a relatively pure state by means of a simple process and at a very reasonable cost.

I claim as my invention:

1. A process for extracting vanadium from petroleum hydrocarbons which consists in treating the hydrocarbons to drive off the volatile materials and subjecting the residue to a leaching action with a vanadium solvent fluid to recover the vanadium compounds therefrom, removing the solvent and recovering the vanadium compounds.

2. A process for extracting vanadium from petroleum hydrocarbons which consists in heat treating a residual cokey hydrocarbon to drive off the volatile material, continuing said treatment until the addition of moisture thereto discloses the appearance of a yellowish substance on the surface thereof, then subjecting the residual substance to a leaching action with a solvent having the qualities of dissolving vanadium compounds and finally relieving the solution of its vanadium content.

3. A process for extracting vanadium from petroleum hydrocarbons which consists in heat treating a residual cokey hydrocarbon in the presence of an absorptive material, driving off the volatile material by said heat treatment and continuing the heating until the addition of moisture discloses the appearance of a yellowish substance on the treated mixture, subjecting said mixture to the leaching action of a solvent adapted to dissolve vanadium compounds and finally relieving the solution of its vanadium content.

4. A process for extracting vanadium from petroleum hydrocarbons which consists in heat treating a residual cokey hydrocarbon in the presence of an absorptive activated carbonaceous substance, driving off the volatile material by said heat treatment and continuing the heating until the addition of moisture discloses the appearance of a yellowish substance on the treated mixture, subjecting said mixture to the leaching action of a solvent adapted to dissolve vanadium compounds and finally relieving the solution of its vanadium content.

5. A process for extracting vanadium from petroleum hydrocarbons which consists in heat treating a residual cokey hydrocarbon in the presence of an absorptive material, driving off the volatile material by said heat treatment and continuing the heating until the addition of moisture discloses the appearance of a yellowish vanadium compound, concentrating the vanadium content of the mixture by periodic additions of hydrocarbon material, subjecting the mixture to successive leaching actions with a vanadium solvent and treating the solution to recover the vanadium compounds therefrom.

6. A process for extracting vanadium from petroleum hydrocarbons which consists in heat treating a residual cokey hydrocarbon in the presence of an absorptive activated carbonaceous substance, driving off the volatile material by said heat treatment and continuing the heating until the addition of moisture discloses the appearance of a yellowish vanadium compound on the surfaces thereof, concentrating the vanadium content of the mixture by additions of hydrocarbon material, subjecting the mixture to the leaching action of a solvent of the vanadium compounds and treating the solution to recover therefrom vanadium compounds.

ALFRED OBERLE.